United States Patent [19]

Rau et al.

[11] Patent Number: 4,530,269

[45] Date of Patent: Jul. 23, 1985

[54] REMOTELY INITIATED SEPARATION LATCH ASSEMBLY

[75] Inventors: William G. Rau, Malvern; Edward A. Wojtowicz, Bryn Mawr, both of Pa.

[73] Assignee: Burroughs Corp., Detroit, Mich.

[21] Appl. No.: 494,065

[22] Filed: May 12, 1983

[51] Int. Cl.³ .............................................. F41F 5/00
[52] U.S. Cl. ..................................... 89/1.14; 102/293; 102/378; 220/261; 403/2; 367/173; 367/4
[58] Field of Search .......................... 89/1 B, 1.8, 11; 441/6–8, 23, 24, 28, 32, 33; 220/261; 403/2; 292/DIG. 65, DIG. 66:DIG. 1; 102/377, 375, 357, 202.5, 202.11, 202.7, 293; 367/4, 165, 173

[56] References Cited

U.S. PATENT DOCUMENTS

| | | | |
|---|---|---|---|
| 3,034,293 | 3/1962 | Ferris et al. | 102/378 |
| 3,070,014 | 12/1962 | Gose | 102/378 |
| 3,130,703 | 4/1964 | Thompson | 89/1 B |
| 3,140,886 | 7/1964 | Cotilla et al. | 367/4 |
| 3,309,649 | 3/1967 | Ballard et al. | 441/33 |
| 3,319,520 | 5/1967 | Stefano et al. | 102/378 |
| 3,716,010 | 2/1973 | Wilson et al. | 102/378 |
| 3,717,096 | 2/1973 | Ward | 102/202.11 |
| 3,994,201 | 11/1976 | Bendler et al. | 89/1 B |

Primary Examiner—Harold J. Tudor
Attorney, Agent, or Firm—Francis A. Varallo; Mervyn L. Young; K. R. Peterson

[57] ABSTRACT

The present disclosure describes a latch assembly wherein structural members are coupled to each other by an electric match-type device interposed therebetween. The latter device generally comprises a body portion having electrical connections thereto and a rigid mass of combustible material firmly adhered to an extremity thereof. At least a pair of the structural members are individually coupled to the combustible material. Remote activation of the match by the passage of electric current therethrough results in the firing of the combustible material and the consequent opening of the latch through the elimination of the coupling force between the structural members.

10 Claims, 7 Drawing Figures

REMOTELY INITIATED SEPARATION LATCH ASSEMBLY

BACKGROUND OF THE INVENTION

Diverse applications exist for a latching assembly which is initially closed and which may be opened upon command of an external signal. One such application involves a sonobuoy which is a device equipped with a hydrophone for detecting underwater sounds and a radio for transmitting them to a remote receiver. Large numbers of such sonobuoys may be launched by aircraft and it is necessary that within a predetermined time after impacting the water, the hydrophone assembly be released from each sonobuoy housing, and be developed to the desired depth below the surface of the water. What is required for this application is a latching assembly capable of retaining the stored hydrophone in the sonobuoy prior to its deployment and of releasing the hydrophone upon command, such as may be provided by an electrical signal. Moreover, the latching assembly must be reliable, compact and light-weight since the latter are important criteria in sonobuoy design, and low cost, in keeping with the large number of sonobuoys commonly employed.

The latching assembly of the present invention fulfills all of the foregoing requirements and while it is admirably suited for the sonobuoy application, the invention should not be considered as limited thereto.

SUMMARY OF THE INVENTION

In accordance with the present invention, a latch assembly is provided which in a closed state is comprised of structural members joined to each other by virtue of the body structure and combustible material which make up an electric match-type device. Although the present invention is not constrained to any particular geometry of electric match, one such match that has been employed in actual operative embodiments of the invention is available from Atlas Chemical Industries Inc., of Wilmington, Del. The stated function of such matches is in electric blasting caps where they are used to detonate the pyrotechnic material in the cap, which in turn detonates the main dynamite charge. This particular electric match is comprised of a substantially planar truncated triangular body of composite non-combustible materials providing electrical connections to the device—the latter connections terminating in a bridge wire at the tapered extremity thereof. A bulbous drop of combustible material is deposited over the bridge wire and the tapered body extremity to which it firmly adheres as a rigid mass. Application of a voltage potential to the electrical connections on the match body causes the bridge wire to incandesce, thereby igniting the combustible material. The resultant short duration flame provides complete burning and gasification of the combustible material, leaving the match body and electrical connections intact.

As will be described in detail hereinafter in connection with the preferred embodiments, the latch assembly of the present invention relies upon the coupling of a first structural member to the body of a match-like device, and the coupling of a second structural member desired to be latched to the first member, to the combustible material to be ignited by the device. In the latched condition, a load may be retained and supported by the structural members. The burning of the combustible material in response to an electrical command to the device, destroys the latching force, permitting the load to be released from the members.

The actual coupling of a structural member to the combustible material may be made by a bonding adhesive or the member may be specially configured to permit its retention of the mass of combustible material. In general the burning away of the material upon command initiates a separation phase aided by external forces such as gravity or auxiliary spring means. On the other hand, the geometry of the coupling of the structural member to the combustible material may be chosen to take advantage of the gas pressure created during the burning of the material to aid in the separation process by urging the two members apart. For example, if the combustible material is in the form of a bulbous drop at an extremity of the match body, the structural member coupled thereto may provide a cup-like retainer which will partially enclose the material. This will result in a momentary entrapment of the combustion gases and the generation of a separation velocity.

Other features and advantages of the present invention will become apparent in the detailed description of the invention which follows.

DESCRIPTION OF THE PREFERRED EMBODIMENTS

Figure 1:
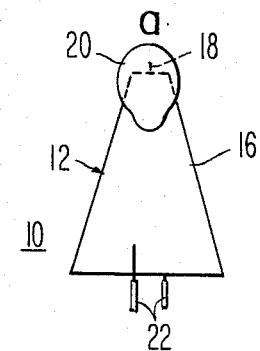
FIGS. 1a and 1b are front and side views respectively of a typical electric match-type device used in the latch assembly of the present invention.
Figure 1:
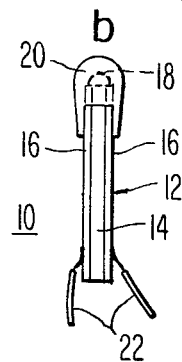

Before proceeding with a description of the latch assembly of the present invention, it is believed helpful to consider the characteristics of the electric match depicted in FIGS. 1a and 1b, and described by Atlas Chemical Industries, Inc., as a component of the blasting caps which it manufactures.

With reference to FIGS. 1a and 1b, the electric match 10 is comprised of a substantially planar, truncated triangular-shaped body 12. The latter is fabricated as a laminated composition, which includes a center section 14 of glass epoxy material and two outer layers 16 of copper disposed respectively on opposite sides thereof. A thin bridge wire 18 is soldered to the two copper layers 14, at the tapered extremity of the match body 12, and offers a high electrical resistance to the passage of current therethrough. In manufacture, the tapered end of the match is then dipped in a combustible material so that in successive layers, a bulbous drop 20 is formed over the bridge wire 18. The material is then solidified by drying. When an electrical potential is applied to the two wires 22 attached to the copper layers 16, current through the bridge wire 18 causes it to incandesce and thereby to ignite the combustible material 20. The latter produces a short duration directed flame which results in complete burning and gasification of the material.

The match body 12, however, remains intact after ignition is complete. It should be noted that the burning of the combustible material 20 may take place under water, with the same results.

Figure 2:
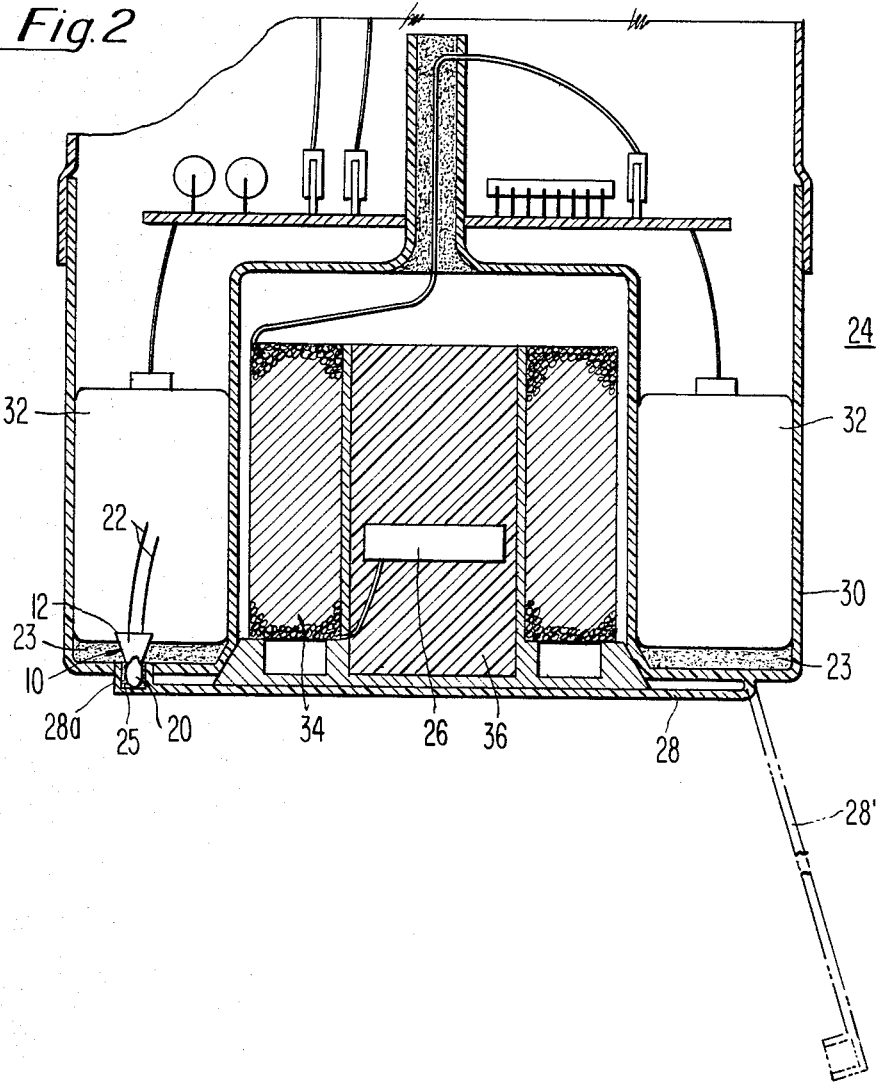
FIG. 2 is a partial, simplified view of a sonobuoy utilizing an embodiment of the present latch assembly.

FIG. 2 is a partial, simplified view of a sonobuoy 24, utilizing an embodiment of the latch assembly of the present invention to retain a stored hydrophone 26 prior to deployment and to release the latter, on command.

With reference to FIG. 2, a plastic (polypropylene) strap 28, which may be molded integrally with the sonobuoy housing 30, or as a separate piece fastened at one extremity thereof to the housing, is used in connection with an electric match-type device 10 to retain the hydrophone within the sonobuoy. The mechanical strength of the retention is a function of the shear force of attachment of the combustible material 20 to the match body 12. This may be of the order of 5 to 7 pounds. The body 12 of the match 10 is fastened inside the sonobuoy 24 by an epoxy adhesive 23 and its rigid head 20 of combustible material may be coupled to the free extremity 28a of the plastic strap 28 by a suitable adhesive 25, such as a cyano-acrylate. In practice, the free end 28a of the strap is preferably formed into a cup-like enclosure. The match combustible material 20 is then cemented into the enclosure which almost completely envelops the match head. The outer copper plates 16 of the match body 12 are wired via a sea water sensing switch (not shown) to batteries 32 within the sonobuoy housing 30. In actual practice, after the sonobuoy has been launched, the match and latch assemblies are situated just below the water surface.

The opening of the latch assembly and deployment of the hydrophone 26 which is retained within a cable pack assembly 34 by open cell foam 36 occur as follows. After a predetermined delay measured from the time that the sonobuoy 24 impacts the water, the sea water switch closes the electrical circuit to the match 10. The match is fired, and the combustible material 20 is burned away. Consequently, the adhesive bond to the plastic strap 18 is destroyed, the free end 28a of the strap separates from the match 10 and assumes its original molded position 28' as indicated by the dashed lines. If desired, a spring member (not shown) may be positioned between the sonobuoy 24 and the strap 28 and compressed during latch up to assist in quickly opening the latch assembly. This minimizes hydrophone deployment time, and prevents the inhibiting of the separation of the hydrophone 26. The latter then drops via its cable assembly 34 to the predetermined desired depth.

In connection with the speed of opening of the latch assembly, the use of the cup-like enclosure at the free end 28a of the strap, traps the gases produced during the burning of the combustible material 20, thereby pushing the strap 28 away from the sonobuoy 24. As noted hereinbefore, the gas pressure yields a separation velocity and permits separation, independent of external forces such as gravity or springs.

Figure 3:
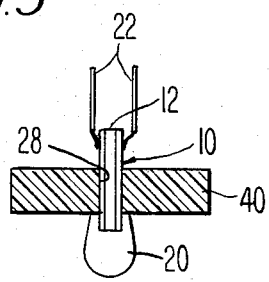
FIG. 3 illustrates one form of mechanical coupling suitable for the latch assembly of FIG. 2.
Figure 4:
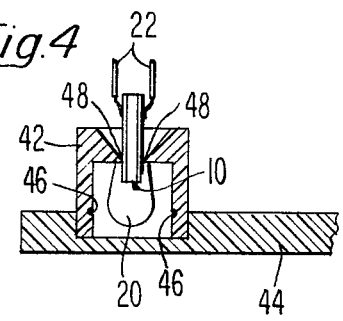
FIG. 4 illustrates another form of mechanical coupling which may be used in the assembly of FIG. 2.

In the embodiment of the invention illustrated in FIG. 2, one structural member, the sonobuoy housing 30, was attached to the body 12 of the match 10, while the other member, a plastic strap 38 was coupled to the combustible material 20 of the match by a suitable adhesive 25. FIGS. 3 and 4 are exemplary of mechanical joint implementations which eliminate the need for the last mentioned adhesive bond.

In FIG. 3 the latch is created by inserting the end of the match body 12 opposite to that having the combustible material 20, through a small aperture 38 in the plastic strap 40. The electrical connections are then made to the match body 12 by soldering wires 22 to opposite sides thereof. The rigid drop of combustible material 20 now retains the latch. When the match 10 is fired, gravity or auxiliary springs (not shown) separate the latch and release the hydrophone 26. Gas pressure separation may be accomplished as previously described by enclosing the combustible material in a cup-like enclosure (not shown, but similar to 28a of FIG. 2) attached to the free end of the strap 40, after the match 10 has been inserted therein. The holding or retention force provided by this arrangement is a function of the adherence of the combustible material 20 to the match body 12, and is considered to be a maximum.

In FIG. 4, the combustible material 20 of the match 10 is gripped by pivotable plastic jaws 42 appearing at the free extremity of the strap 44. The jaws 42 are permitted to flex sufficiently to permit the match head 20 to be inserted therein, by two slots 46, and a hinge geometry at the base of the jaws. The jaws 42 have a sufficient lead-in angle so as provide mechanical advantage for the match head to spread the jaws on insertion. The match holder jaws 42 may advantageously be a separate part which is adhesively bonded to the latch strap 44. This would permit the part to be molded. Holding power is obtained by sharp corners 48 on the jaws which does not permit camming in the opposite direction. This arrangement provides simplicity in assembly, since the free end of the strap must simply be rotated toward the sonobuoy housing and snapped into the latch position over the match head 20.

Figure 5:
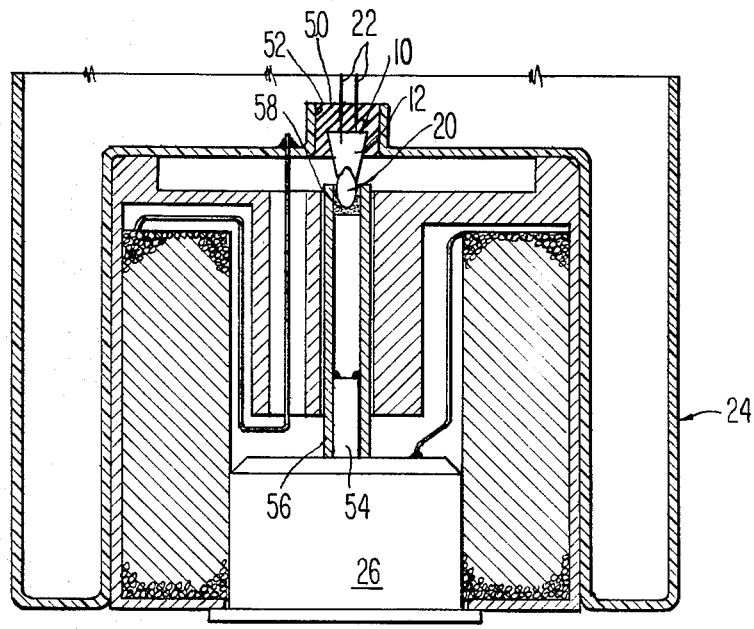
FIG. 5 depicts in partial, simplified form a sonobuoy, using a second embodiment of the latch assembly.

FIG. 5 illustrates another embodiment of the present invention. The purpose of the match-like device 10 in a latch assembly remains the same as that previously described, namely, to support the hydrophone assembly 26 in the sonobuoy 24 and to release it upon command. The support and release function is achieved by creating a separable junction, one half of which is in the buoy and the other half is attached to an extension of the hydrophone. The junction half located in the sonobuoy float is an electric match-type device 10, with its body 12 disposed in a rubber sealing plug 50 seated in a cavity 52 in the top of the sonobuoy housing 30. FIG. 5 illustrates the hydrophone assembly 26 in a stored position with the sonobuoy 24 prior to deployment.

The present embodiment of the assembly is implemented by providing a dowel-like projection 54 on the top of the hydrophone assembly 26, fitting one extremity of a section of plastic (TYGON) tubing 56 over the projection, and cementing it in place. The opposite extremity of the plastic tubing 56 receives the combustible material 20 on one end of the match-like device 10, the body 12 of which is retained in the rubber plug 50 prior to its insertion in its retaining cavity 52 in the sonobuoy housing. The combustible material 20 deforms the plastic tube 56 slightly and provides a tight fit. Additionally, the combustible material is affixed to the plastic tubing with a suitable adhesive 58, care being taken not to attach the body 12 of the match-like device to the tube 56. The hydrophone assembly 26 is lifted toward the top of the sonobuoy housing and while maintaining tension on the supporting match wires 22, the rubber plug 50 is displaced downward and press fitted into the cavity 52 of the housing 30. The press fit is sufficient to retain the hydrophone assembly 24 in its stored postion.

As in the case of the embodiment of the latch assembly depicted in FIG. 2, opening of the latch and release of the hydrophone 26 is accomplished by applying an electrical potential to the wires 22. This causes the combustible material 20 of the match to burn away, thereby destroying the holding force provided by the adhesive attachment of the combustible material 20 to the plastic tube 56.

Figure 6:
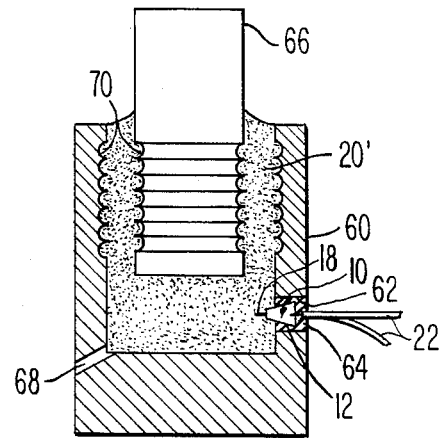
FIG. 6 depicts still another embodiment of the latch assembly of the present invention.

Still another embodiment of the latch assembly of the present invention is illustrated in FIG. 6. This embodiment has particular utility in linear and torsional applications where large holding forces are required between the structural members being latched together prior to their release. The latter is accomplished through the use of an electric match-type device in the same manner as that described hereinbefore.

With reference to FIG. 6, a first structural member in the form of a cup-shaped outer shaft 60 is attached to the body 12 of an electric match-type device 10. The device is disposed in an aperture 62 in the wall structure of the last mentioned member 60, either by being cemented therein with a suitable adhesive or being retained by a plug 64, as illustrated. A second structural member comprised of a solid cylindrical shaft 66 and oriented coaxially with the first member 60 is disposed within the cup provided by the latter. The second member 66 is coupled to a rigid mass of combustible material 20' within the cup which is associated with the electric match-type device 10, and adapted to be ignited thereby. The combustible material 20' is assumed to be similar to that forming the bulbous drop 20 at the head of the electric match 10 depicted in FIGS 1a and 1b and has the same adhesive properties.

In fabricating the latch assembly of FIG. 6, the distance between the inner wall of the first outer structural member 60 and the surface of the second inner structural member 66 is kept to a minimum so that the coupling load is transmitted primarily in shear. The combustible material 20' is fabricated by dipping the second member 66 into a combustible adhesive slurry until a sufficient thickness of combustible material is built upon its surfaces. It is then inserted into the cup of the first member 60 to a predetermined depth. A bond is thereby created between the two members. Additionally, the combustible material adhering to the lower planar surface of the second member 66 covers an extremity of an electric match-type device 10. The latter may be similar to that depicted in FIGS. 1a and 1b, in which case the original drop 20 at the head of the match becomes homogeneous with the remaining combustible material 20', or the match-like device may provide merely a bridge wire 18 adapted to be embedded in the larger mass of combustible material 20'. In either case, the operation of the latch assembly is identical. Application of a voltage potential to the body 12 of the match 10, causes the bridge wire 18 to glow, thereby igniting the combustible material 20' releasing the structural members 60 and 66 from each other. Because of the larger mass of combustible material, a vent 68 is provided in a wall of member 60 to better control the escape of the gases built up during combustion, thereby eliminating any possibility of an explosive reaction.

The embodiment of FIG. 6 maximizes the holding force between the members 60 and 66—the latter being easily attached to respective additional members (not shown) as desired. The holding force is a function of the interface areas of the two members. Gas pressure separations as described hereinbefore, is preserved by the cup geometry of member 66. As indicated in FIG. 6, the inner wall of the first outer member 60 and the surface of the inner member 66 may have concentric ridges 70 formed therein to further increase the holding force exerted between the structural members by virtue of the adhesive properties of the combustible material 20'.

In summary there has been taught a latching assembly for coupling structural members to each other and thereby retaining a load. The retention technique makes use of a joint formed directly on the combustible material associated with an electric match-type device. Actuation of the latter causes burning of the combustible material, with consequent elimination of the holding force at the joint and the release of the load. The burning of the combustible material takes place in a relatively safe manner, with no explosive forces being generated. The latch assembly of the present invention is very low cost. Additionally, it has the advantage of being compact in size and light weight.

As noted hereinbefore, although the latching assembly has been described in connection with the deployment of sonobuoy hydrophones, the invention is not to be construed as limited thereto. It is apparent that diverse applications may advantageously employ the techniques taught herein. Depending upon the particular application, changes and modifications of the assembly may be required. Such changes and modifications insofar as they are not departures from the true scope of the invention, are intended to be covered by the claims which follow.

We claim:

1. A remotely actuated latch assembly comprising in combination:

a plurality of structural members, an electric match-type device comprising a noncombustible body member having a pair of spaced-apart electrically conductive sections joined to each other by a bridge wire, a rigid mass of combustible material, said rigid mass of combustible material enveloping said bridge wire and being firmly adhered to said body member, means for applying an electrical potential to said conductive sections for causing said bridge wire to incandesce and to initiate the burning of said combustible material, at least a first of said structural members being affixed to said noncombustible body member of said electric match-type device, a second of said structural members being coupled to said rigid mass of combustible material of said electric match-type device, thereby causing said latch assembly to assume a closed state wherein said first and second of said structural members are effectively coupled to each other, and whereupon the burning of said combustible material in response to the application of said electrical potential to said conductive sections destroys the coupling force between said first and second of said structural members and causes said latch assembly to assume an open state.

2. A latch assembly as defined in claim 1 wherein said first of said structural members comprises a housing, said housing having opposite extremities, one of said housing extremities being closed and the other of said housing extremities being open, said noncombustible body member of said electric match-type device being disposed adjacent the open extremity of said housing, and said second of said structural members comprises a strap disposed across said open extremity of said housing, said strap having opposite extremities, one extremity of said strap being permanently attached to said housing and the opposite free extremity of said strap being coupled to said rigid mass of combustible material of said electric match-type device.

3. A latch assembly as defined in claim 2 wherein said rigid mass of combustible material has the form of a bulbous drop disposed at one extremity of said body member of said electric match-type device.

4. A latch assembly as defined in claim 3 wherein said strap includes a cup-like enclosure at said free extremity thereof for receiving and substantially enveloping said bulbous drop of combustible material, and adhesive means for cementing said combustible material within said cup-like enclosure.

5. A latch assembly as defined in claim 3 wherein said strap includes at said free extremity an aperture for receiving the extremity of said body member of said match-type device opposite to that having said combustible material prior to the attachment of said body member to said housing, said aperture having smaller dimensions than those of said drop of combustible material whereby said strap and said housing are held in coupling relationship, their release from each other being effected by the burning upon command of said drop of combustible material.

6. A latch assembly as defined in claim 3 wherein said strap includes at said free extremity thereof, pivotable plastic jaws, said jaws being capable of flexure and having a sufficient lead-in angle to permit the entry of said bulbous drop of combustible material as the strap is snapped into the closed latch position, said jaws further including sharp-edged shoulder means for bearing against said drop after capture within said jaws to prevent the camming of the latter and the release of the drop.

7. A latch assembly as defined in claim 1 further including load means disposed relative to at least one of said structural members such that it is retained thereby in opposition to gravitational forces when said latch assembly is in said closed state and being released thereby when said latch assembly assumes said open state.

8. A latch assembly as defined in claim 7 wherein said first structural member comprises a cylindrical housing having its longitudinal axis oriented in a vertical plane and being enclosed at its uppermost extremity, said extremity of said last mentioned member being coupled to said combustible material by plug means disposed therein and attached to said body member of said electric match-type device, said second structural member comprising a length of flexible tubing, and means for attaching the opposite extremities of said tubing respectively to said load means and to said combustible material, said load means being retained within said housing in opposition to gravitational forces by the last mentioned attachments.

9. A latch assembly as defined in claim 1 wherein said first structural member comprises a cylindrical shaft having a cup-shaped aperture at one extremity thereof, said body member of said electric match-type device being disposed in the wall structures of said cup-shaped aperture and oriented such that its bridge wire is located within said aperture, said second structural member comprising a solid cylindrical shaft, an end portion of said shaft being inserted to a predetermined depth within said cup-shaped aperture, said combustible material covering said bridge wire and filling the void between the inner surface of said cup-shaped aperture and the outer surface of said solid cylindrical shaft, said combustible material with its adhesive properties effectively coupling said first and second structural members to each other.

10. A latch assembly as defined in claim 9 wherein the inner surface of said cup-shaped aperture of said first structural member and the outer surface of the portion of said shaft of said second structural member disposedd eithin said cup-shaped aperture are circumferentially ribbed to increase the coupling force between the structural members provided by the adhesive properties of said combustible material.

* * * * *